United States Patent
Huang et al.

(10) Patent No.: US 8,427,992 B2
(45) Date of Patent: Apr. 23, 2013

(54) POWER-EFFICIENT BACKBONE-ORIENTED WIRELESS SENSOR NETWORK, METHOD FOR CONSTRUCTING THE SAME AND METHOD FOR REPAIRING THE SAME

(75) Inventors: Kuei-Li Huang, Kaohsiung (TW);
Chao-Nan Wu, Taipei County (TW);
Jui-Tang Wang, Keelung (TW);
Chien-Chao Tseng, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 301 days.

(21) Appl. No.: 12/845,042

(22) Filed: Jul. 28, 2010

(65) Prior Publication Data
US 2011/0051644 A1    Mar. 3, 2011

(30) Foreign Application Priority Data
Aug. 28, 2009 (TW) .................. 98129017 A

(51) Int. Cl.
*G08C 17/00* (2006.01)

(52) U.S. Cl.
USPC ............................................................ 370/311

(58) Field of Classification Search .................... 370/311
See application file for complete search history.

(56) References Cited

U.S. PATENT DOCUMENTS

| | | | |
|---|---|---|---|
| 7,830,838 B2 * | 11/2010 | Kohvakka et al. ............. | 370/330 |
| 7,920,512 B2 * | 4/2011 | Maltseff et al. ............... | 370/328 |
| 2003/0063585 A1 * | 4/2003 | Younis et al. .................. | 370/331 |
| 2006/0215588 A1 * | 9/2006 | Yoon .............................. | 370/310 |
| 2007/0270096 A1 * | 11/2007 | Nozaki ............................. | 455/7 |
| 2009/0147714 A1 * | 6/2009 | Jain et al. ....................... | 370/311 |
| 2009/0325486 A1 * | 12/2009 | Kim ............................... | 455/41.2 |

FOREIGN PATENT DOCUMENTS

CN    101360051 A    2/2009

OTHER PUBLICATIONS

W. Heinzelman, A. Chandrakasan, and H. Balakrishnan, "Energy-Efficient Communication Protocols for Wireless Microsensor Networks (LEACH)", Proc. of the 33rd Hawaii International Conference on Systems Science—vol. 8, pp. 3005-3014, Jan. 4-7, 2000.
S. Lindsey, C.S. Raghavendra, "PEGASIS: Power-Efficient Gathering in Sensor Information Systems", Aerospace Conference Proceedings, 2002, IEEE, vol. 3, pp. 3-1125-3-1130, 2002.
Sung-Ming Jung, Young-Ju Han, Tai-Myoung Chung, "The Concentric Clustering Scheme for Efficient Energy Consumption in the PEGASIS", Advanced Communication Technology, The 9th International Conference on, vol. 1, pp. 260-265, Feb. 12-14, 2007.
Yong Ma, J.H. Aylor, "System Lifetime Optimization for Heterogeneous Sensor Networks with a Hub-Spoke Topology", Transactions on Mobile Computing, vol. 3, No. 3, pp. 286-294, Jul.-Aug. 2004.
S. Soro and W.B. Heinzelman, "Prolonging the Lifetime of Wireless Sensor Networks via Unequal Clustering", Parallel and Distributed Processing Symposium, 2005, Proceedings 19th IEEE International, Apr. 4-8, 2005.
Communication From Chinese Patent Office Regarding a Counterpart Application Dated Oct. 10, 2012.

* cited by examiner

*Primary Examiner* — Kenny Lin
(74) *Attorney, Agent, or Firm* — Rosenberg, Klein & Lee

(57) ABSTRACT

The present invention discloses a power-efficient backbone-oriented wireless sensor network, a method for constructing the same and a method for repairing the same, wherein energy-rich nodes are used to form backbones linking to a server, and wherein regular nodes having limited energy storage link to the backbones. When one energy-rich node malfunctions, the energy-rich node, which is posterior to the malfunctioning energy-rich node, searches for and links to a linkable neighboring energy-rich node on the backbone. If there is none linkable neighboring energy-rich node, the regular nodes are used to form a temporary tunnel until the malfunctioning energy-rich node has been repaired. The present invention can relieve the influence of hot spots, increase the robustness of the wireless sensor network, and prolong the service life of the wireless sensor network.

10 Claims, 13 Drawing Sheets

US 8,427,992 B2

POWER-EFFICIENT BACKBONE-ORIENTED WIRELESS SENSOR NETWORK, METHOD FOR CONSTRUCTING THE SAME AND METHOD FOR REPAIRING THE SAME

BACKGROUND OF THE INVENTION

1. Field of the Invention

The present invention relates to a technology to improve the conventional wireless sensor network, particularly to a power-efficient backbone-oriented wireless sensor network, a method for constructing the same and a method for repairing the same.

2. Description of the Related Art

The wireless sensor network is mainly used to detect the values of physical parameters in the environment, such as temperature, pressure, humidity and sound, wherein many sensor nodes are arranged in the observed environment. The self-organization capability of the sensor nodes will form a wireless communication network. The sensor nodes detect specified parameters and transmit the detection results to the sink or the data collector via the wireless communication network. The detection results are processed and analyzed, and then appropriate responses are made. As a wireless sensor network can operate without manual operation or manual administration, it has been widely used in many fields, such as military detection, healthcare, environmental surveillance, and home security. The IEEE802.15.4 standard in TG4 of IEEE802.15 features low rate, low power consumption and low cost, and thus quite meets the requirements of a wireless sensor network. Therefore, IEEE802.15.4 has been one of the protocols adopted by wireless sensor networks.

In the researches of wireless sensor networks, power consumption is always a hot topic. In a sensor network, each sensor node transmits the collected data to the server. However, numerous sensor nodes are distributed in the environment respectively with different distances to the server. Thus, not all the sensor nodes are able to directly connect with the server. The sensor nodes distant from the server rely on the sensor nodes near the server to pass their data to the server. Therefore, the nearer a sensor node is to the server, the heavier the burden the sensor node bears. A sensor node usually has limited power storage. When energy is used up, the posterior sensor nodes cannot send their data to the server. Thus, the sensor network malfunctions. Refer to FIG. 1. Nodes A, B and C are three sensor nodes 12 nearest to a server 10. Nodes A, B and C not only have to transmit their own data but also have to transmit data for the posterior sensor nodes 12. Therefore, Nodes A, B and C have loads heavier than the other sensor nodes 12. Thus, Nodes A, B and C consume energy in a higher rate. When Node A, B or C exhausts the energy thereof, the posterior sensor nodes 12 cannot send their data to the server 12. As a result, the sensor network malfunctions. In such a case, Node A, B or C becomes the so-called hot spot. Although the sensor nodes 12 posterior to the hot spot still have electric energy, they cannot transmit the data to the server 12. Therefore, the hot-spot problem will decrease the operation duration of the sensor network.

Accordingly, the present invention proposes a power-efficient backbone-oriented wireless sensor network, a method for constructing the same and a method for repairing the same to decrease the hot spots and prolong the operation duration. The architecture and embodiments of the present invention will be described in detail below.

SUMMARY OF THE INVENTION

The primary objective of the present invention is to provide a power-efficient backbone-oriented wireless sensor network, a method for constructing the same and a method for repairing the same, wherein energy-rich nodes are used to form a backbone of the wireless sensor network to reduce hot spots, decrease power consumption rate of regular nodes, and prolong the service life of the wireless sensor network.

Another objective of the present invention is to provide a method for repairing a power-efficient backbone-oriented wireless sensor network, which can recover the function of the backbone of the wireless sensor network, and which can thus prevent backbone operation from being interrupted and prolong the service life of the wireless sensor network.

A further objective of the present invention is to provide a method for repairing a power-efficient backbone-oriented wireless sensor network, which uses other energy-rich nodes to establish a new link when one energy-rich node malfunctions, and which can alternatively use regular nodes to establish a temporary tunnel to solve the emergency of network interruption and prolong the operation duration of the wireless sensor network.

To achieve the abovementioned objectives, the present invention proposes a power-efficient backbone-oriented wireless sensor network, which comprises at least one backbone, a plurality of branches, and a server. The backbone includes a plurality of first nodes with rich power, and each first node is identified by a level-1 identification code and its level-2 identification code is set zero. Each branch has at least one second node having a limited power-supply capability. Each second node has a level-1 identification code identical to that of the first node the second node links to and a level-2 identification code. The backbone links to the server. The server assigns level-1 identification codes to the first nodes. The branches may also link to the server. The level-2 identification codes of each branch are assigned by the first node the branch directly links to. The level-2 identification codes of the branch linking to the server are assigned by the server. The level-1 identification codes or the level-2 identification codes are assigned according to the ZigBee network protocol or another method.

The present invention also proposes a method for constructing a power-efficient backbone-oriented wireless sensor network, which comprises steps: selecting nodes able to persistently supplying power, nodes having abundant power, nodes making spacing of the first nodes smaller or nodes located at positions predetermined to be passed through by a user, as a plurality of first nodes from a plurality of nodes and the other nodes functioning as second nodes; cascading the first nodes to form at least one backbone according to an identification-code assigning mechanism, and linking the front ends of the backbones to a server; cascading the second nodes to form a plurality of branches, and linking each branch to one first node of one backbone.

The present invention also proposes a method for repairing a power-efficient backbone-oriented wireless sensor network. The power-efficient backbone-oriented wireless sensor network comprises a server, at least one backbone including a plurality of energy-rich nodes, a plurality of branches each including a plurality of regular nodes. When one energy-rich node malfunctions, the method for repairing the sensor network comprises steps: the energy-rich node posterior to the malfunctioning energy-rich node performing search to determine whether a linkable neighboring energy-rich node exists; if there is a linkable neighboring energy-rich node existing, the searching energy-rich node linking to the linkable neighboring energy-rich node; assigning new identification codes to the re-linked backbone and the branches linking to the re-linked backbone; if there is no linkable neighboring energy-rich node existing, the searching energy-rich node performing search to determine whether a neighboring regular node exists; if there is at least one neighboring regular node existing, the searching energy-rich node linking to one neighboring regular node; assigning new identification codes to the re-linked backbone and the branches linking to the re-linked backbone.

Below, the embodiments are described in detail to make easily understood the objectives, technical contents, characteristics and accomplishments of the present invention.

DETAILED DESCRIPTION OF THE INVENTION

Based on the practical wireless network environment available currently, the present invention proposes a power-efficient backbone-oriented wireless sensor network, a method for constructing the same and a method for repairing the same. Suppose a plurality of battery-powered sensors is arranged in an environment to detect local temperatures or perform a monitoring task. If the battery-powered sensors are arranged indoors, the sensors arranged along aisles where it is convenient to replace batteries may be selected to function as electricity-abundant nodes. If the battery-powered sensors are arranged indoors, some of the sensors are equipped with solar panels to function as electricity-abundant nodes. In the present invention, the electricity-abundant nodes are called energy-rich nodes.

Figure 1:
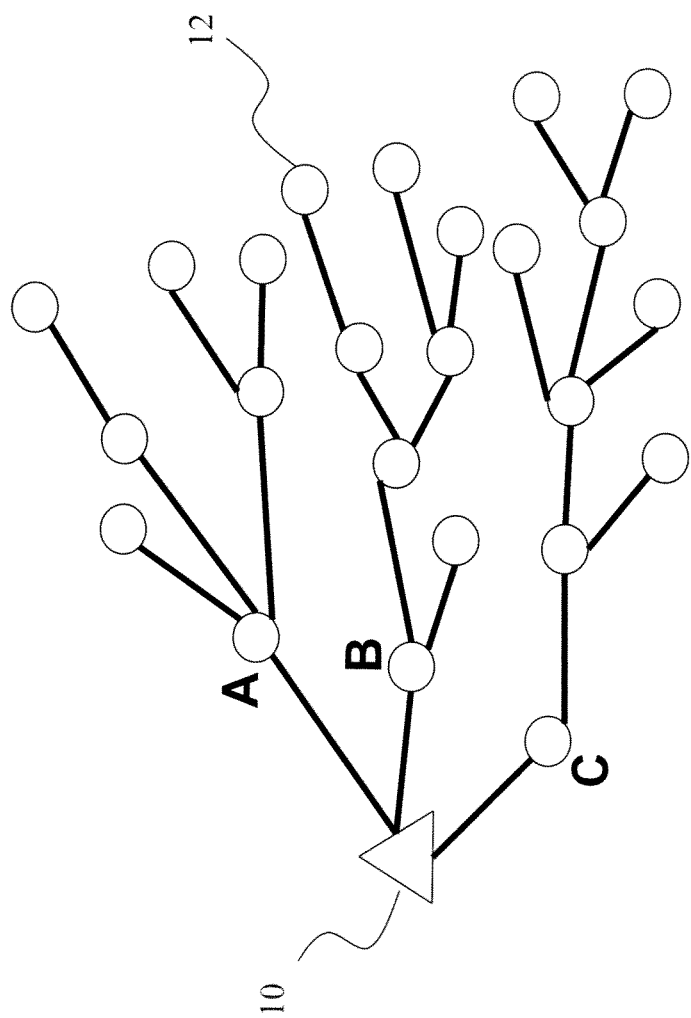
FIG. 1 is a diagram schematically showing a conventional wireless sensor network.
Figure 2:
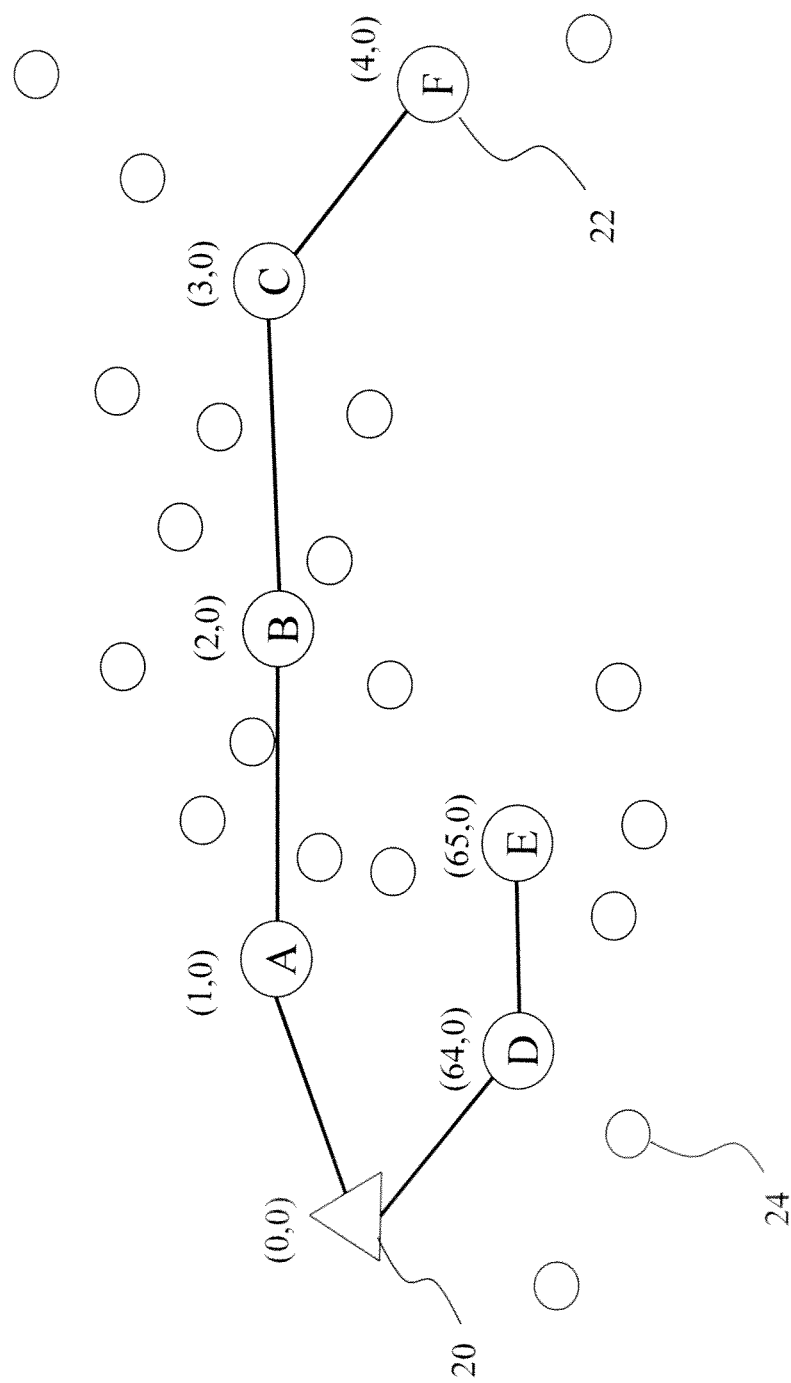
FIG. 2 and FIG. 3 are diagrams schematically showing the architecture of a power-efficient backbone-oriented wireless sensor network according to the present invention.
Figure 3:
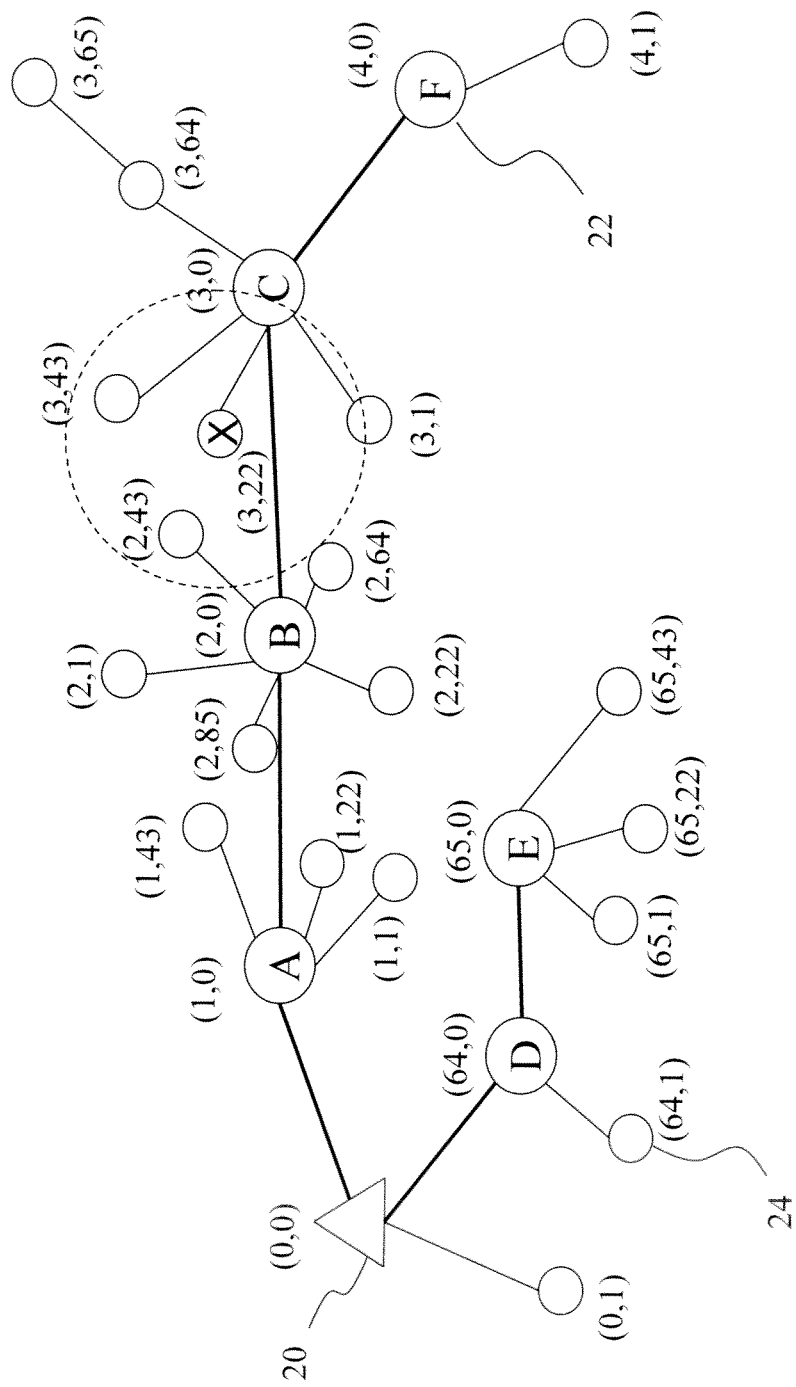

Refer to FIG. 2 a diagram schematically showing the architecture of a power-efficient backbone-oriented wireless sensor network according to the present invention. The architecture comprises a plurality of energy-rich nodes 22 and a plurality of regular nodes 24. The energy-rich nodes 22 may be nodes able to persistently supplying power, nodes having abundant power, nodes making spacing of the energy-rich nodes 22 smaller, and nodes located at positions predetermined to be passed through by a user. Each energy-rich node 22 can directly communicate with at least one of the energy-rich nodes 22. The energy-rich nodes 22 inside the detection area are interconnected to form backbones. Two backbones are formed in the embodiment shown in FIG. 1 (perhaps there are two aisles in the indoor environment). The backbones link to a server 10. Each regular node 24 searches for the other regular nodes 24 or the energy-rich node 22 and links to them, whereby a branch is formed inside the detection area of the regular node 24. Refer to FIG. 3. Herein, a regular node X is used to exemplify the linking process. The detection area of the regular node X is the area enclosed by the dotted circle. Inside the detection area of the regular node X, there are an energy-rich node C and three other regular nodes 24. To minimize the degrees of branches, the regular node X normally chooses to link to the energy-rich node C. The regular nodes 24 function to detect temperature or perform a monitoring task. The energy-rich nodes 22 may also function to perform detection as the regular nodes 24. Alternatively, the energy-rich nodes 22 do not perform any detection task but only supply power to the regular nodes 24.

Herein, the ZigBee architecture is used to exemplify the wireless sensor network of the present invention. In the ZigBee environment, when a new energy-rich node is intended to join the network, the request to join the network is sent to the server 20. The server 20 assigns a level-1 identification code to the energy-rich node 22, whereby the energy-rich node 22 can administrate more nodes. When the energy-rich node 22 receives the identification code, the degree is preset to be zero in the beacon sent out by the energy-rich node 22. Once finding the energy-rich node 22, the regular nodes 24 may link to the energy-rich node 22 to shorten the data-transmission paths. When one regular node 24 requests to join the network, the action is the same as the ZigBee standard requires, and the requesting regular node 24 asks to link to a regular node 24 having a lower degree. Then, the energy-rich node 22 linking to the linked regular node 24 (the energy-rich nodes nearest to the linked regular node 22) assigns a level-2 identification code to the requesting regular node 24. Thus, the level-1 identification code of one energy-rich node 22 is assigned by the server 20, and the level-2 identification code of the energy-rich node 22 is preset to be zero; the level-1 identification code of one regular node 24 is the same as that of the energy-rich node 22 linking to the regular node 24, and the level-2 identification code of the regular node 24 is assigned by the energy-rich node 22 linking to the regular node 24.

After the backbone-oriented structure has been established, the regular nodes send the detection data to the linked energy-rich nodes. Then, the energy-rich nodes transmit the data to the server 20 via the backbones, whereby the power consumption of the regular nodes is reduced. When the server 20 sends data to the posterior nodes, the data is transmitted to the designated energy-rich nodes 22 via the backbones. Then, the designated energy-rich nodes 22 pass the data to the regular nodes therebelow.

When one energy-rich node malfunctions, the posterior nodes cannot transmit their data, and the data transmission of the network is interrupted. Below, two methods are proposed to compensate for the damage caused by a malfunctioning energy-rich node.

Figure 4A:
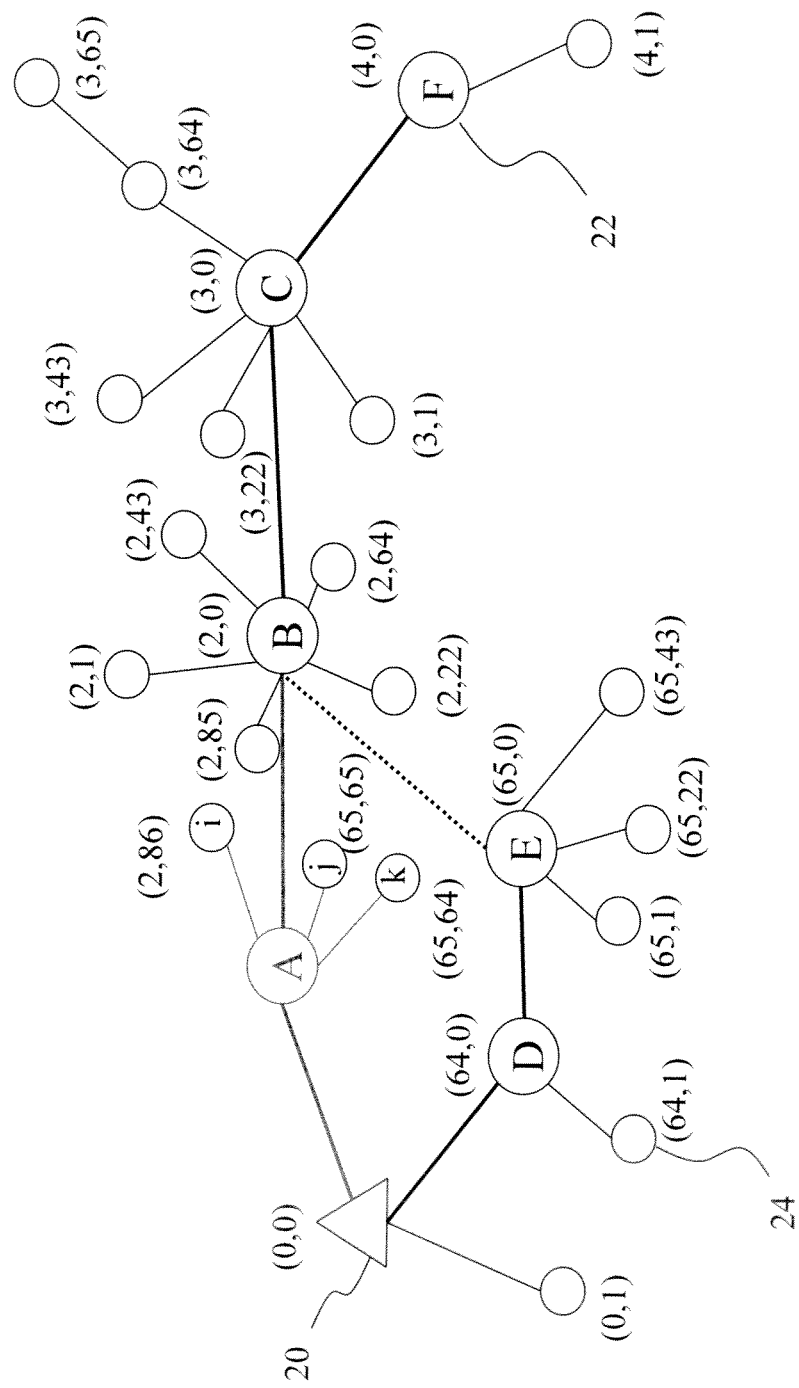
FIG. 4A and FIG. 4B are diagrams schematically showing that that another energy-rich node is used to repair network damage caused by a malfunctioning energy-rich node according to one embodiment of the present invention.
Figure 4B:
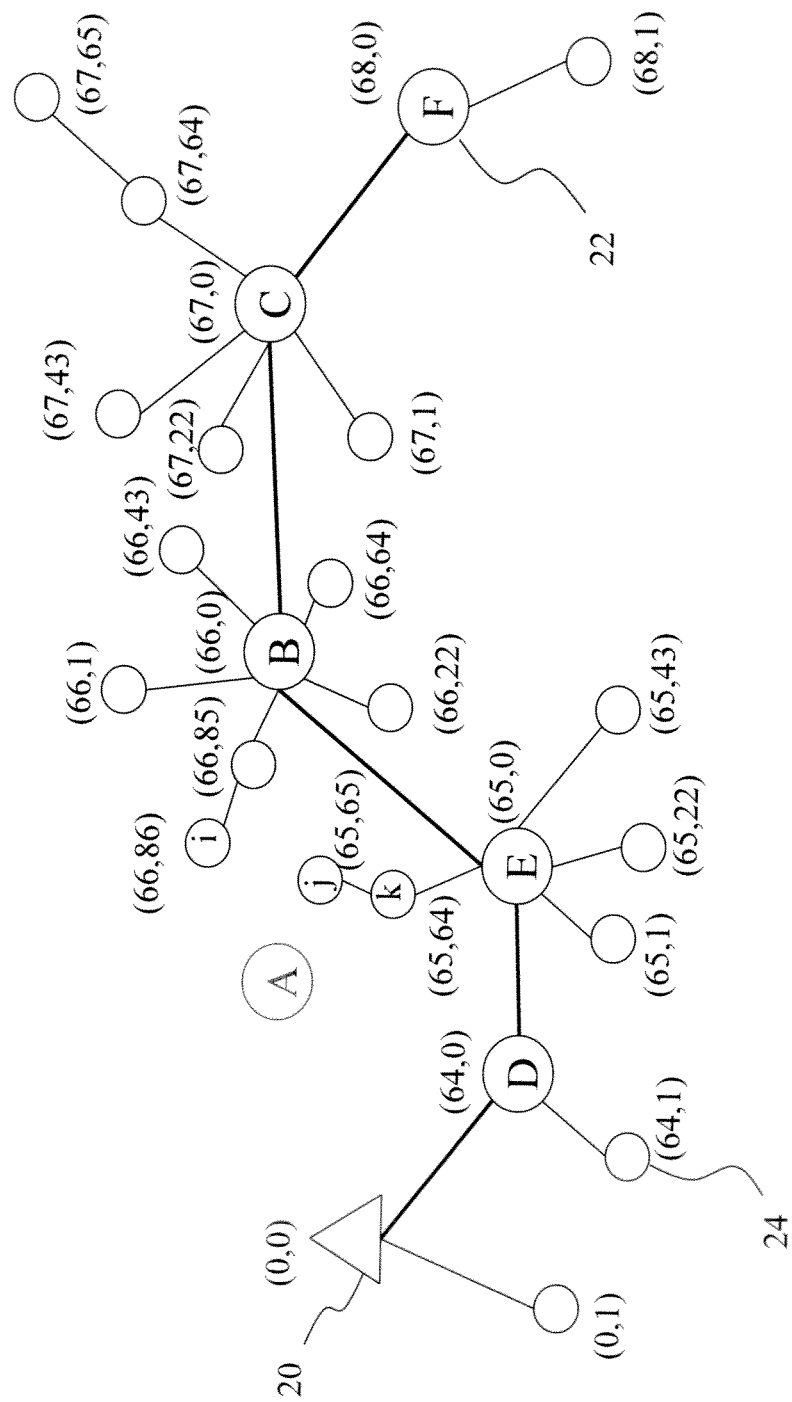

Refer to FIG. 4A and FIG. 4B diagrams schematically showing that another energy-rich node is used to repair network damage caused by a malfunctioning energy-rich node. When an energy-rich node A malfunctions, the posterior regular nodes i, j and k are disconnected from the network. Further, the energy-rich nodes B, C and D posterior to the energy-rich node A cannot transmit data to the server 20. When finding that data cannot be sent out, the energy-rich node B begins to search and determine whether there are linkable neighboring energy-rich nodes. As shown in FIG. 4A, the energy-rich node B finds that the energy-rich node E is linkable. Then, the energy-rich node B links to the energy-rich node E and joins the backbone that the energy-rich node E belongs to. Thus, the energy-rich node B returns to the network. The regular nodes i, j and k originally posterior to the energy-rich node A also search for and link to linkable neighboring energy-rich nodes or linkable neighboring regular nodes. The energy-rich nodes B and E respectively belong to different backbones originally; therefore, the re-linked energy-rich node B, and the backbone and branches posterior to the energy-rich node B have to assume new level-1 and level-2 identification codes. Similarly, the regular nodes i, j and k also respectively assume new level-1 and level-2 identification codes according to the energy-rich nodes or regular nodes where they link currently. Thereby, the re-linked energy-rich node and regular nodes can transmit data again via the new identification codes.

Figure 5A:
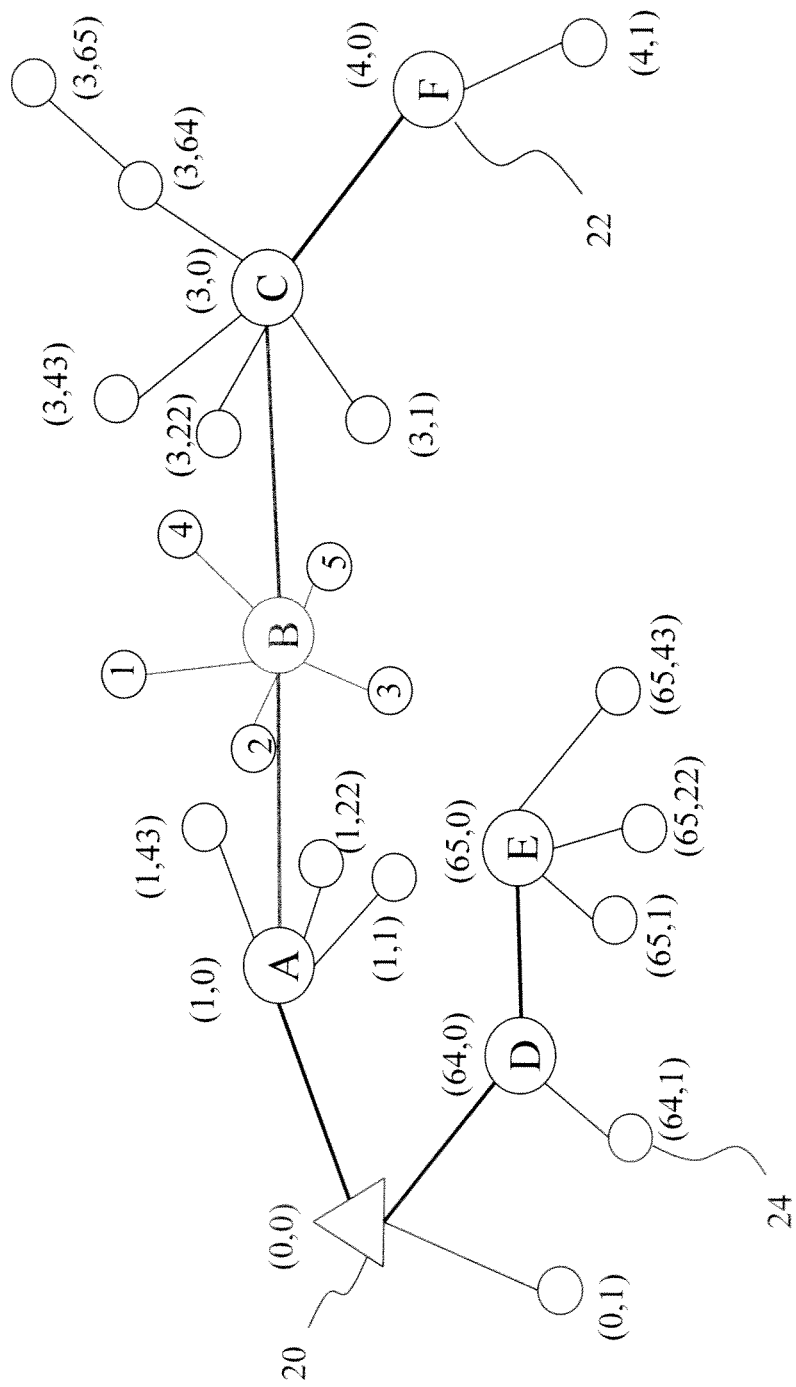
FIGS. 5A-5E are diagrams schematically showing that regular nodes are used to repair the damaged wireless sensor network according to one embodiment of the present invention.
Figure 5B:
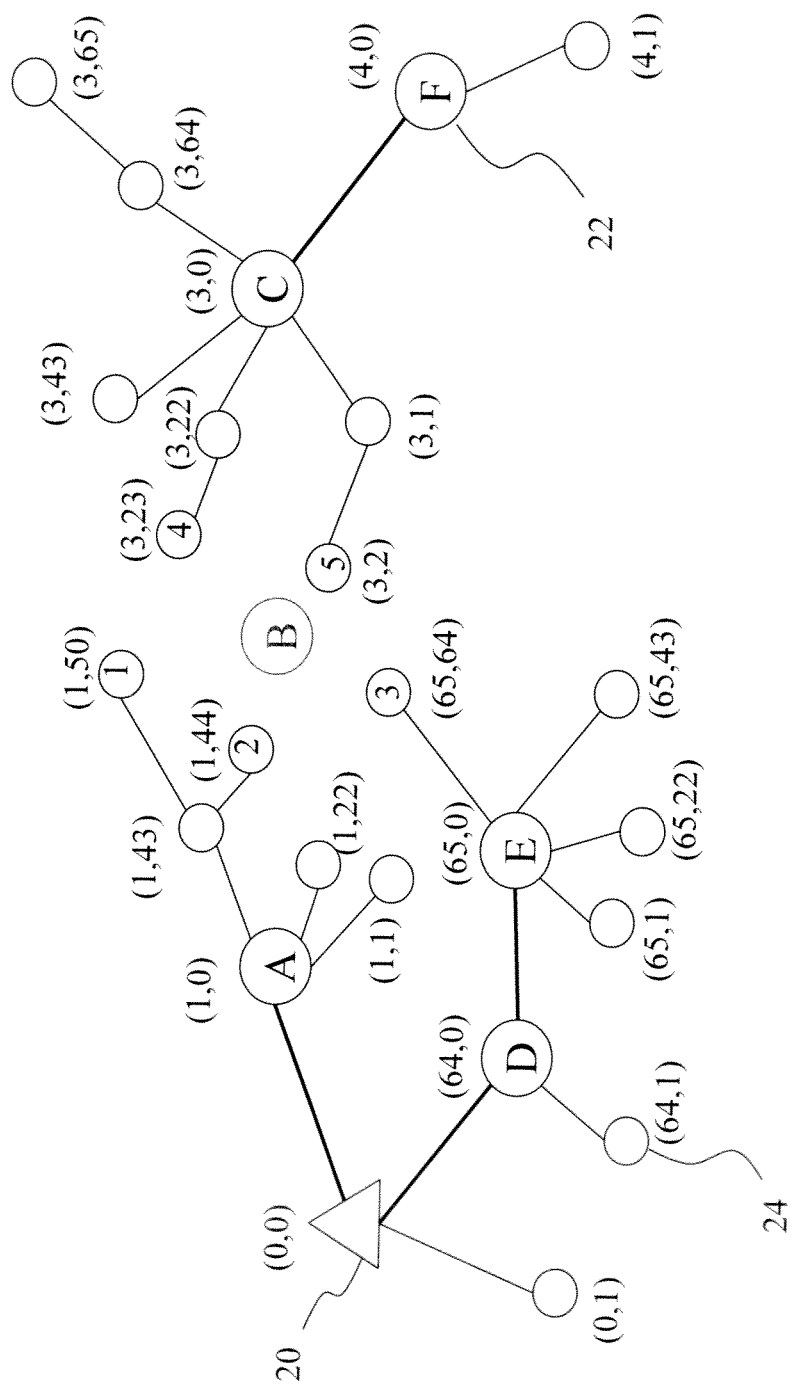
Figure 5C:
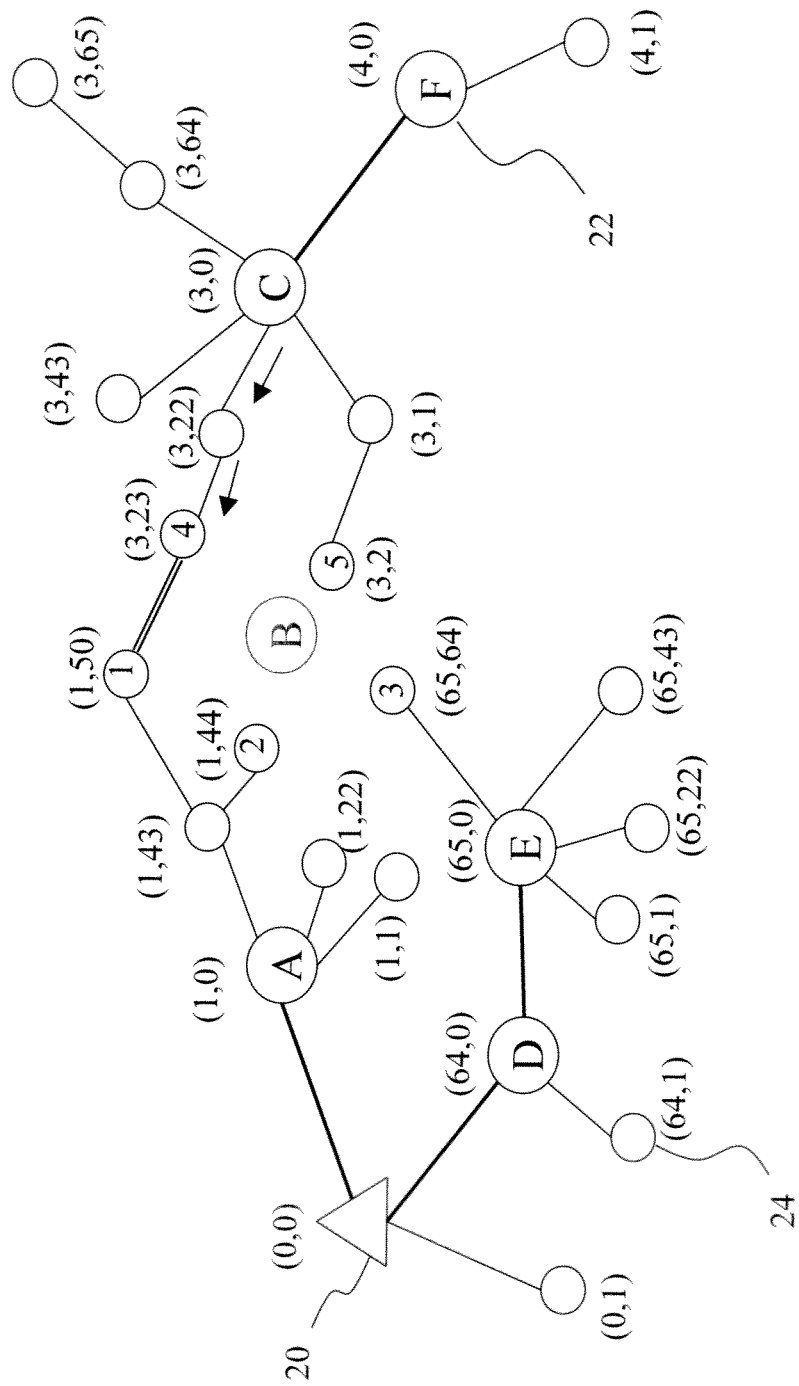
Figure 5D:
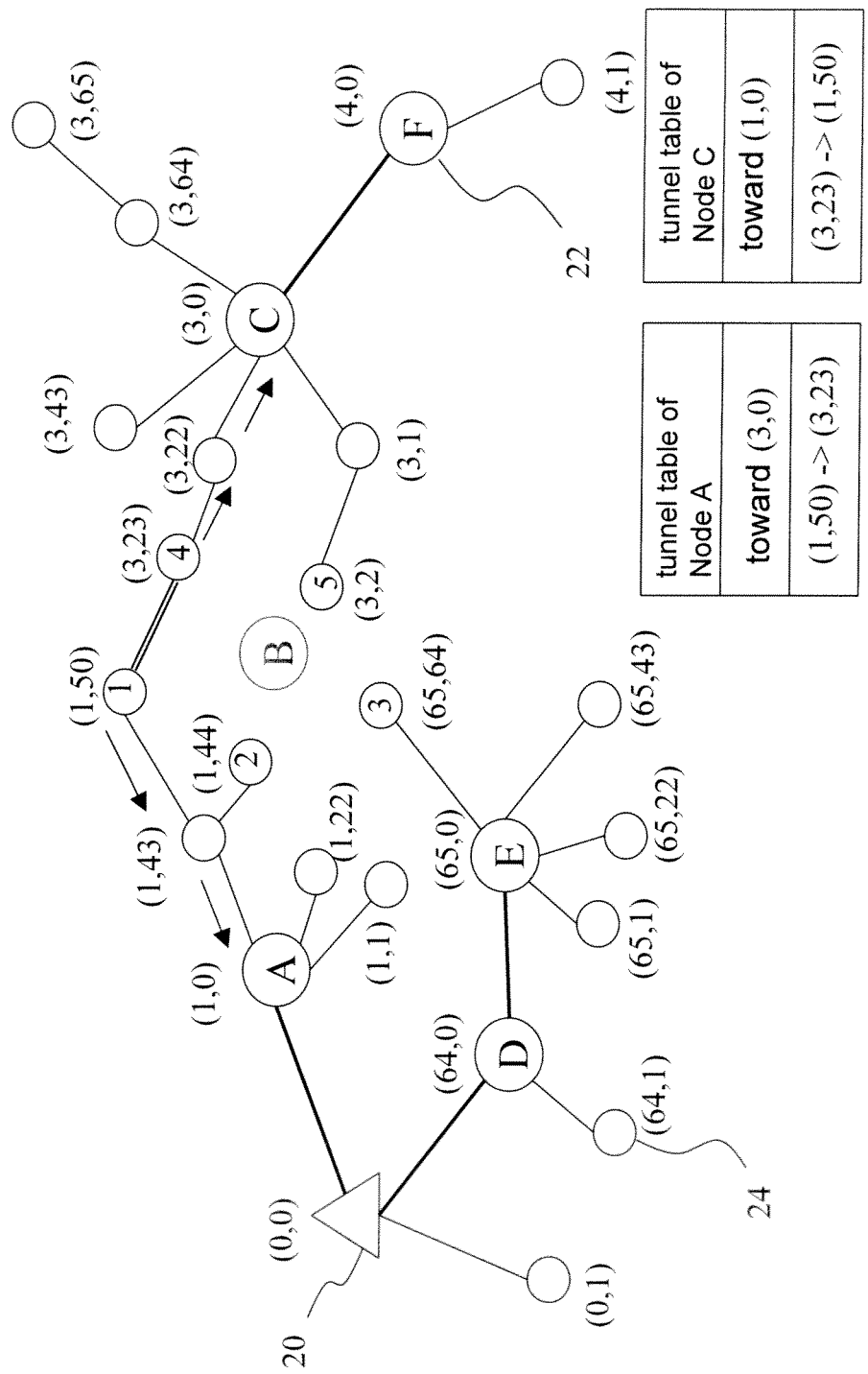
Figure 5E:
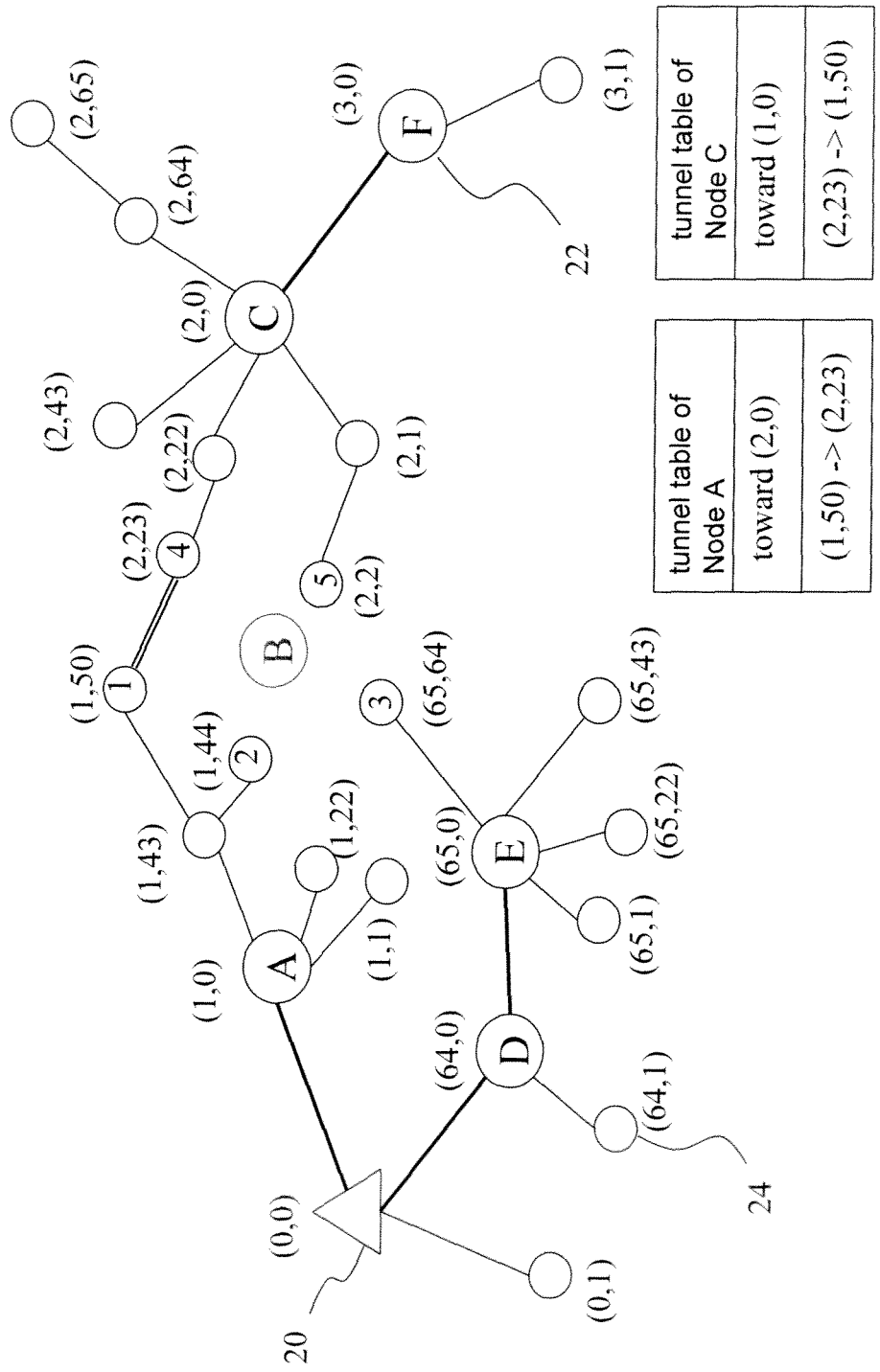

Refer to FIGS. 5A-5E diagrams schematically showing that regular nodes are used to repair the damaged wireless sensor network. Suppose that an energy-rich node B malfunctions, and that the energy-rich node C posterior to the energy-rich B cannot communicate with the energy-rich node A anterior to the energy-rich node B, and that the energy-rich nodes 22 posterior to the energy-rich node B cannot detect any linkable energy-rich node 22 of another backbone. In such a case, regular nodes 24 are used to construct a temporary tunnel. When data is transferred to the damaged part of the backbone, the data will be transferred to the other side of the backbone via the temporary tunnel. The details are as follow. As shown in FIG. 5A and FIG. 5B, the energy-rich node B fails, and the regular nodes 1, 2, 3, 4 and 5 linking to the energy-rich node B are disconnected from the network. Thus, the regular nodes 1, 3, 4 and 5 search for and (directly or indirectly) link to linkable neighboring energy-rich nodes, and inform the newly-linked energy-rich nodes that they originally link to the energy-rich node B. Then, the level-1 identification codes of the regular nodes 1, 2, 3, 4 and 5 are respectively changed to those of the newly-linked energy-rich nodes, and the newly-linked energy-rich nodes respectively assign new level-2 identification codes to the regular nodes 1, 2, 3, 4 and 5. In such a case, suppose that the energy-rich node C cannot find any linkable energy-rich node 22, and that the energy-rich node C asks the posterior energy-rich node F to search for linkable energy-rich nodes of other backbones, and that the energy-rich node F cannot get any linkable energy-rich node from another backbone. Thus, the energy-rich node C or the posterior energy-rich nodes search for lower-degree regular nodes 24 in the branches thereof to rebuild network connection. As shown in FIG. 5C, the regular node 4 can sense the regular node 1, and the energy-rich node C asks the regular node 4 to build a temporary tunnel. As shown in FIG. 5D, when the regular node 1 receives the message that the energy-rich node C intends to join the network, the regular node 1 acknowledges the request to the energy-rich node C via the regular node 4. At the same time, the regular node 1 informs the energy-rich node A of the request. Then, the energy-rich nodes A and C respectively build their own tunnel tables. The intermediary regular node 24 having an identification code (1, 50) will note that the transmission path has two energy-rich nodes C and F therebehind. As shown in FIG. 5E, the energy-rich node A informs the energy-rich node C of the new level-1 identification code and the tunnel table. The energy-rich node C updates the level-1 and level-2 identification codes of the regular nodes on the branches and renews the tunnel table.

Figure 6:
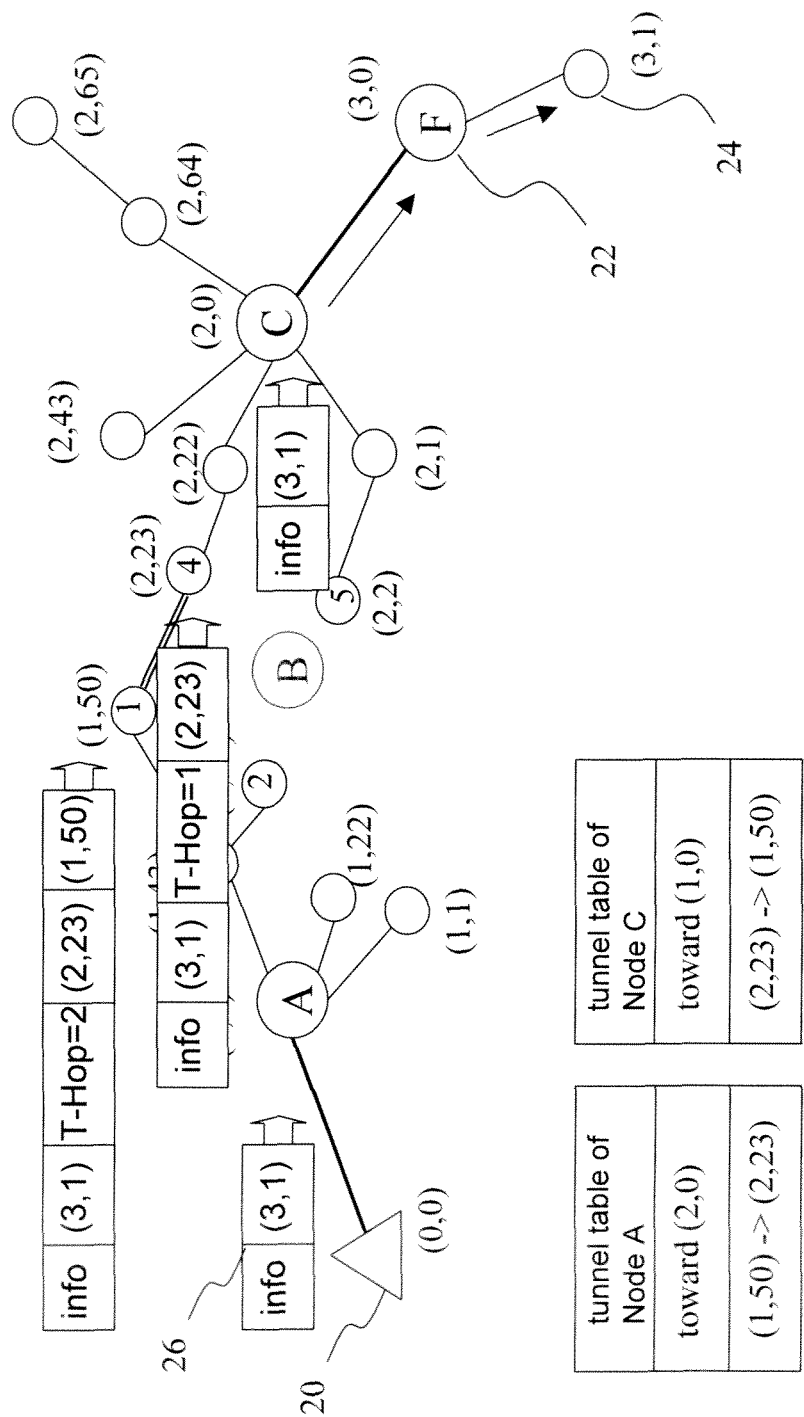
FIG. 6 is a diagram schematically showing that a server transmits a packet to a regular node via a temporary tunnel in the embodiment shown in FIG. 5E.

Refer to FIG. 6 a diagram schematically showing that the server 20 transmits a packet 26 to a regular node (3, 1) behind the energy-rich node F in the embodiment shown in FIG. 5E. The server 20 has an identification code of (0, 0). The packet 26 includes data and the identification code of the destination. When the packet 26 is sent to the regular node 1 on one side of the temporary tunnel, the packet 26 contains the identification codes (1, 50) and (2, 23) of the nodes to be passed later, a message T-Hop=2 indicating that the packet 26 has not yet passed the temporary tunnel, and the identification code (3, 1) of the destination. After the packet 26 passes the temporary tunnel and reaches the regular node 4. T-Hop shifts to "1", which indicates that the packet 26 has passed the temporary tunnel. Simultaneously is removed the identification code (1, 50) of the node that the packet 26 has passed. Then, the packet 26 is transferred toward the regular node (3, 1).

Figure 7:
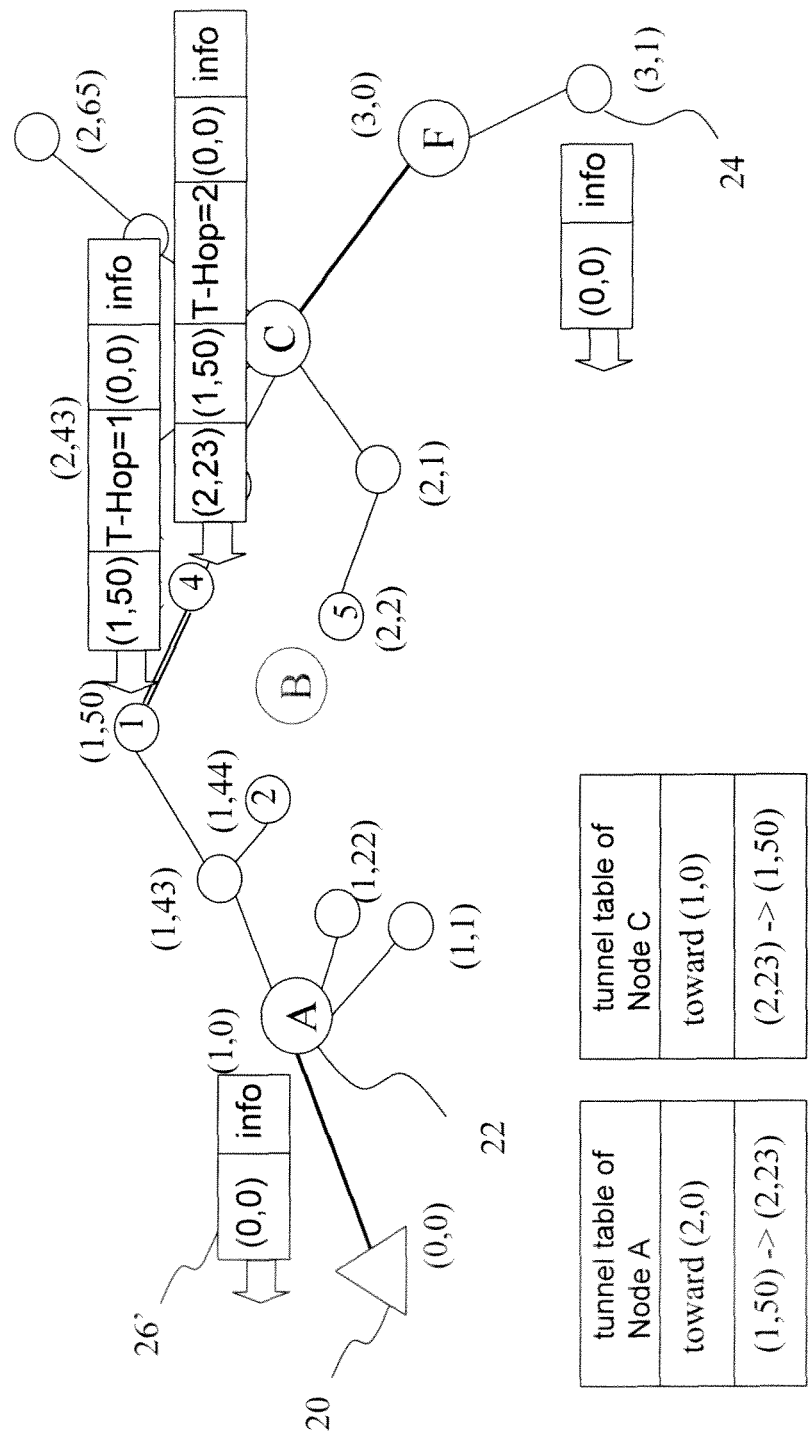
FIG. 7 is a diagram schematically showing that a regular node transmits a packet to a server via a temporary tunnel in the embodiment shown in FIG. 5E.

Refer to FIG. 7 a diagram schematically showing that a regular node (3, 1) behind the energy-rich node F transmits a packet 26' to the server 20 in the embodiment shown in FIG. 5E. The packet 26' includes data and the identification code (0, 0) of the destination. When the packet 26' is sent to the regular node 4 on one side of the temporary tunnel, the packet 26 contains the identification codes (2, 23) and (1, 50) of the nodes to be passed later, a message T-Hop=2 indicating that the packet 26' has not yet passed the temporary tunnel, and the identification code (0, 0) of the destination. After the packet 26' passes the temporary tunnel and reaches the regular node 1, T-Hop shifts to "1", which indicates that the packet 26' has passed the temporary tunnel. Simultaneously is removed the identification code (2, 23) of the node that the packet 26' has passed. Then, the packet 26' is transferred toward the regular node (0, 0).

Figure 8:
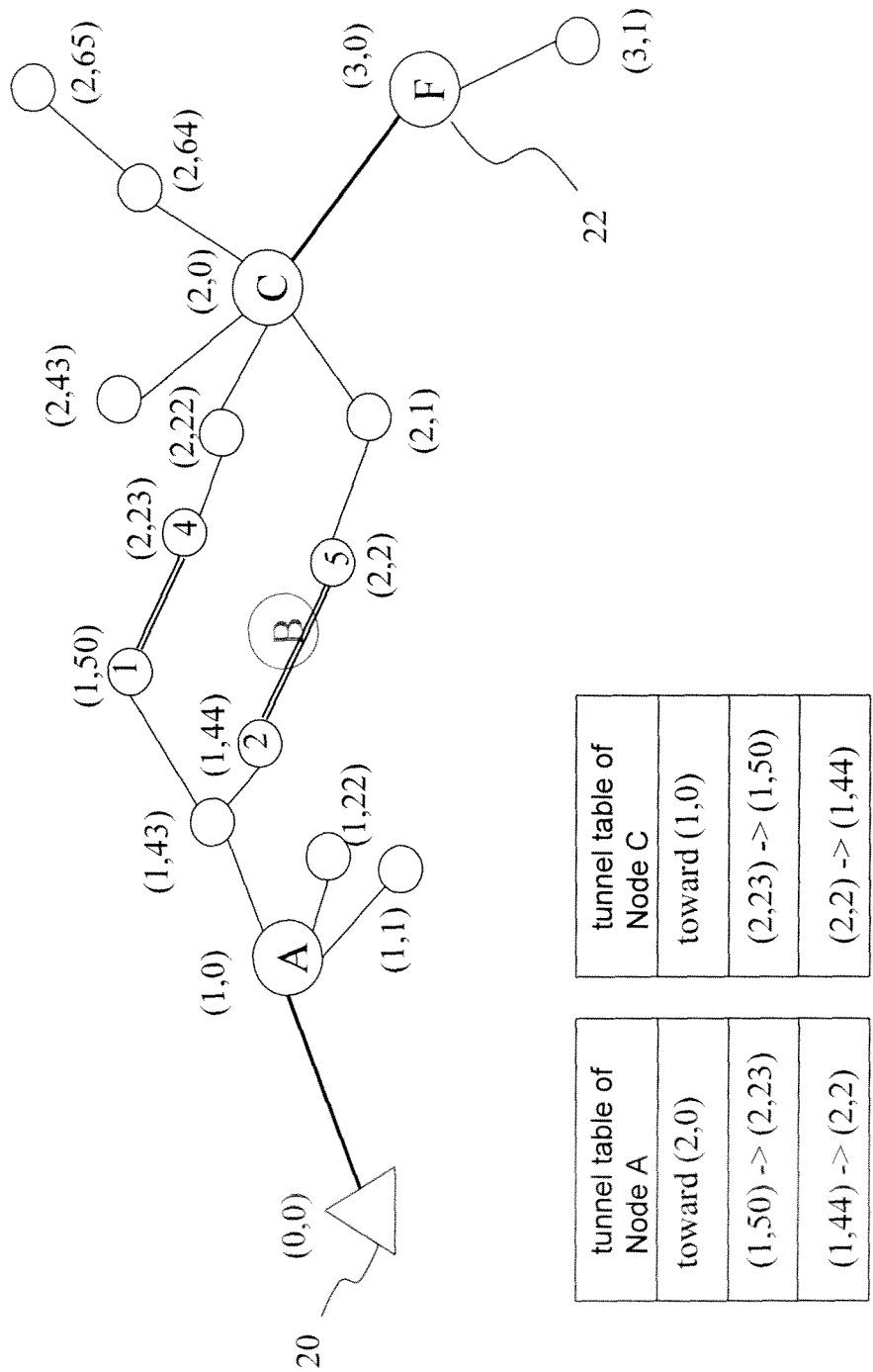
FIG. 8 is a diagram schematically showing that two temporary tunnels are built according to the present invention.

Refer to FIG. 8. The present invention does not limit the sensor network to have only a single temporary tunnel. When more than one regular node 24 can link to the regular nodes 24 of the other energy-rich nodes 22, a plurality of temporary tunnels can be established. Then, the identification codes of the nodes at two sides of the new temporary tunnel are added to the tunnel table.

In the present invention, the level-1 identification code and/or the level-2 identification code are not limited to being assigned by the ZigBee protocol but may be alternatively assigned by another method. For example, the level-1 identification code is assigned by one protocol, and the level-2 identification code is assigned by another protocol. When the identification codes are not assigned by the ZigBee protocol but assigned by another mechanism, the count of the regular nodes of each energy-rich node is not necessarily determined by the server.

In conclusion, the present invention proposes a power-efficient backbone-oriented wireless sensor network, a method for constructing the same and a method for repairing the same, wherein energy-rich nodes are used to relieve the influence of hot spots, and wherein the energy-rich nodes are arranged at special positions to built a backbone network according to the topology of the physical network via the support of hardware or software. One energy-rich node can communicate with at least one of other energy-rich nodes. A plurality of energy-rich nodes can form one or more backbones in a sensor network. Unlike the conventional technology, the present invention requires the sensor node only to transfer data to the nearest energy-rich node, whereby is reduced the power consumption of the sensor nodes nearer to the server, and whereby the burden of transmitting data is shared by the energy-rich nodes on the backbone. Thus, hot spots are transferred to the sensor nodes nearest to the energy-rich nodes. As data-transmission burden is decreased, power consumption is reduced. Then, the operation duration of the network is prolonged.

The embodiments described above are only to exemplify the present invention but not to limit the scope of the present invention. Any equivalent modification or variation according to the spirit of the present invention is to be also included within the scope of the present invention.

What is claimed is:

1. A method for constructing a power-efficient backbone-oriented wireless sensor network comprising steps:
selecting specified nodes from a plurality of nodes as a plurality of first nodes, and letting rest of said nodes function as a plurality of second nodes;
cascading said first nodes to form at least one backbone according to a mechanism of assigning identification codes, and linking front end of said at least one backbone to a server; and
cascading said second nodes into a plurality of branches, and linking said branches to said first nodes on said at least one backbone;
wherein each of said first nodes sends out a beacon having a degree of 0 to said first nodes and said second nodes in surroundings.

2. The method for constructing a power-efficient backbone-oriented wireless sensor network according to claim 1, wherein said server respectively assigns level-1 identification codes to said first nodes.

3. The method for constructing a power-efficient backbone-oriented wireless sensor network according to claim 1, wherein said first nodes respectively assigns level-2 identification codes to said second nodes.

4. The method for constructing a power-efficient backbone-oriented wireless sensor network according to claim 1, wherein signal coverage of one said first node has at least one of other said first nodes.

5. The method for constructing a power-efficient backbone-oriented wireless sensor network according to claim 1, wherein said specified nodes include nodes able to persistently supply power, nodes having greater energy storage, nodes making spacing of said first nodes smaller, and nodes located at positions predetermined by a user.

6. A method for constructing a power-efficient backbone-oriented wireless sensor network comprising steps:
selecting specified nodes from a plurality of nodes as a plurality of first nodes, and letting rest of said nodes function as a plurality of second nodes;
cascading said first nodes to form at least one backbone according to a mechanism of assigning identification codes, and linking front end of said at least one backbone to a server; and
cascading said second nodes into a plurality of branches, and linking said branches to said first nodes on said at least one backbone;
wherein said specified nodes include nodes able to persistently supply power, nodes having greater energy storage, nodes making spacing of said first nodes smaller, and nodes located at positions predetermined by a user.

7. The method for constructing a power-efficient backbone-oriented wireless sensor network according to claim 6, wherein said server respectively assigns level-1 identification codes to said first nodes.

8. The method for constructing a power-efficient backbone-oriented wireless sensor network according to claim 6, wherein said first nodes respectively assigns level-2 identification codes to said second nodes.

9. The method for constructing a power-efficient backbone-oriented wireless sensor network according to claim 6, wherein signal coverage of one said first node has at least one of other said first nodes.

10. The method for constructing a power-efficient backbone-oriented wireless sensor network according to claim 6, wherein each of said first nodes sends out a beacon having a degree of 0 to said first nodes and said second nodes in surroundings.

* * * * *